J. E. LINDSEY.
FASTENING DEVICE.
APPLICATION FILED OCT. 12, 1918.
1,298,976.
Patented Apr. 1, 1919.
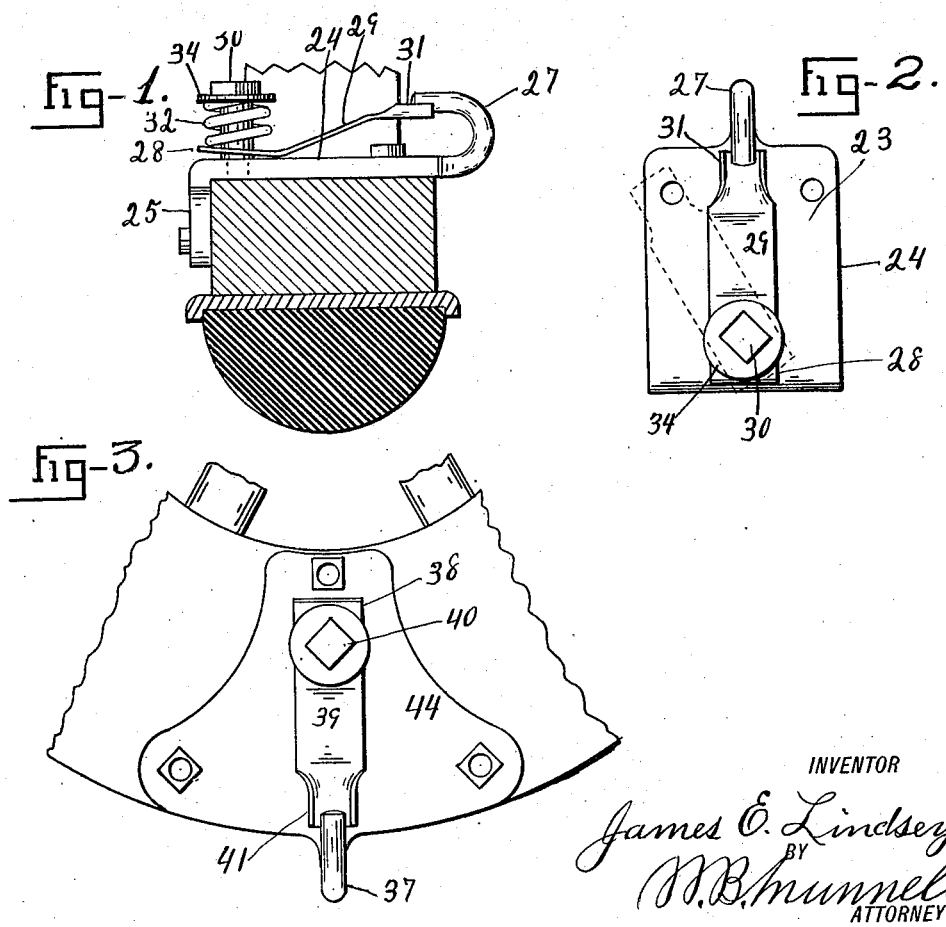

UNITED STATES PATENT OFFICE.

JAMES E. LINDSEY, OF LOUISVILLE, KENTUCKY, ASSIGNOR OF ONE-HALF TO WILLIAM B. O'NEIL, OF LOUISVILLE, KENTUCKY.

FASTENING DEVICE.

1,298,976.     Specification of Letters Patent.     Patented Apr. 1, 1919.

Application filed October 12, 1918. Serial No. 257,822.

*To all whom it may concern:*

Be it known that I, JAMES E. LINDSEY, a citizen of the United States, residing in the city of Louisville, county of Jefferson, and State of Kentucky, have invented certain new and useful Improvements in Fastening Devices, of which the following is a specification.

This invention relates to fastening devices, more especially such as are applicable to automobile wheels for the attachment thereto of anti-skid chains, although they may be found of service in other connections.

Chains are extensively used in connection with the wheels of automobiles to prevent skidding, or to secure greater traction, on slick surfaces or soft ground, the chains being disposed across the periphery of the wheel.

An object of this invention is to provide a device which may be secured to the felly of a wheel and to which the links of a chain may be readily connected and disconnected.

With the foregoing and other objects in view, the invention consists of the novel construction and arrangement of parts illustrated in the accompanying drawing, which forms a part of this specification wherein is set forth an embodiment of the invention, but it is to be understood that such changes and modifications may be resorted to as come within the scope of the appended claims.

In the drawing wherein similar reference characters designate like parts in the several views Figure 1, is a side elevation of an embodiment of the invention as applied to a wheel, a portion of which is shown in section: Fig. 2, is a top plan view of the embodiment illustrated in Fig. 1 and Fig. 3, a plan view of a modification adapted to be applied to the side of a wheel.

In the drawing the reference numeral —20— designates the felly of a wheel, —21— the rim thereof, and —22— a tire mounted upon the rim. The fastening device, which is designated as an entirety by the numeral —23— comprises a base —24— adapted to be secured to the inner face of the felly. At one end of the base there is an angular extension —25— which is adapted to lie against a side of the felly, at the other end is a recurving projection —27— which forms a hook to which a link of an anti-skid chain may be connected. This hook terminates a spaced distance above, and in a plane parallel with the base. An upstanding member —29— which guards the entrance to said hook comprises three integral sections the lower of which —28— is disposed at an angle to the middle section and normally lies in a plane at an angle to the base, the angle resting upon the base and forming a fulcrum on which the guard member may be rocked. The lower section is disposed about a post —30— which is erected on the base. The upper section —31— of the guard member normally lies in a plane parallel with the base and is contoured so as to fit against the under side of the end of the hook. A spring —32— disposed about the post bears against a washer —34— thereon and against the lower terminal 28, of the guard member and serves to hold the upper end —31— thereof against the hook. A link of chain may be engaged over the hook by pressing it down on the guard as with the ordinary snap hook or the entrance to the hook may be left clear by swinging the guard to one side as shown in dotted lines in Fig. 2. Similarly a link may be removed by depressing the guard or swinging it to one side. Some vehicle wheels are so constructed that a fastening device may only be applied to the side of the felly. To meet such conditions I have provided the modification shown in Fig. 3 which comprises a base —44— having a hook —37—, a guard member —39—, a lower terminal —38—, a post —40—, and an upper terminal —41— the construction differing from that shown in Fig. 1, only in the shape of the base plate.

From the foregoing it will be seen that I have produced a fastening device adapted to the use set forth which may be manipulated with great ease and which will securely retain a member in place on the hook.

Having thus described my invention so that anyone skilled in the art pertaining thereto can make and use the same,

I claim:

1. In a device as characterized, a baseplate, a hook projecting from one end thereof, a post erected thereon, a guard member comprising a terminal section contoured to fit against said hook, the other terminal section lying in a lower plane than the first mentioned and being inclined upward from the horizontal, said terminal sections being joined by a middle section, the lower terminal section being pivotally mounted on said post, and a spring disposed about the post and bearing on the lower terminal, and serving to keep the upper terminal in contact with the hook.

2. In a device as characterized, a base, a hook extended from an edge thereof and recurving upward terminating a spaced distance above said base, a guard member comprising upper and lower terminal sections, joined by an intermediate section, the lower section having a perforation therethrough, a post having a head erected on the base and passing freely through said perforation, and a spring disposed about said post and bearing respectively against the bolt head and the lower section of the guard member.

3. In a device as characterized, a base plate, a hook projecting from an edge thereof and curving upward and inward, terminating a spaced distance above and in a plane parallel with the base, a guard member comprising an upstanding body and a bottom section extended at an angle therefrom, said angle contacting with the base, said bottom section having a perforation therethrough, a post having a head erected on the base and passing freely through said perforation, and a spring bearing respectively against the bottom section and the head of the post and serving to hold the upper end of the guard member normally in contact with the end of the hook.

4. In a device as described, a base, a hook extended from an edge thereof and recurving upward terminating a spaced distance above said base, an upstanding guard member having a projection extended at an angle from the lower end thereof, the angle resting upon the base, and acting as a fulcrum for the guard member and a resilient element adapted to act upon said projection and serving to hold the upper end of the guard member normally against the hook.

JAMES E. LINDSEY.

Copies of this patent may be obtained for five cents each, by addressing the "Commissioner of Patents, Washington, D. C."